M. L. CHILSON.
PRESSURE GAGE.
APPLICATION FILED NOV. 25, 1911.
1,089,326.
Patented Mar. 3, 1914.
2 SHEETS—SHEET 1.
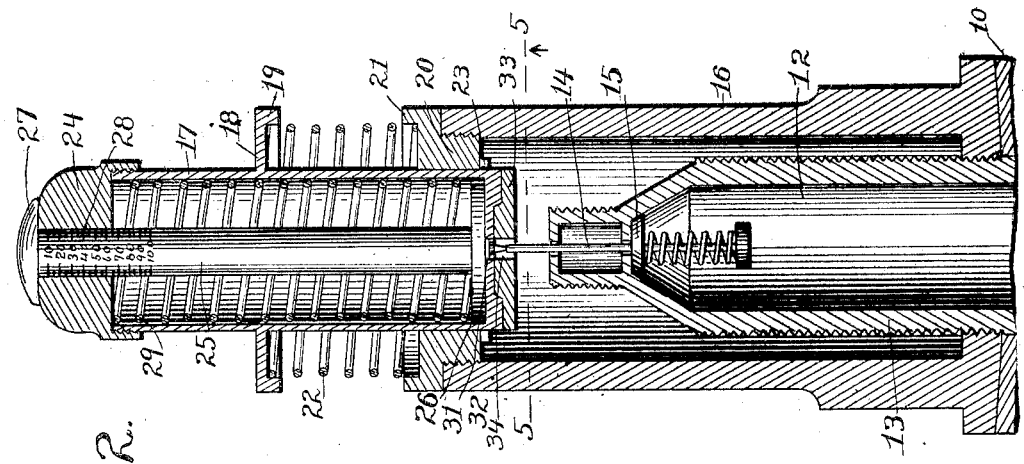
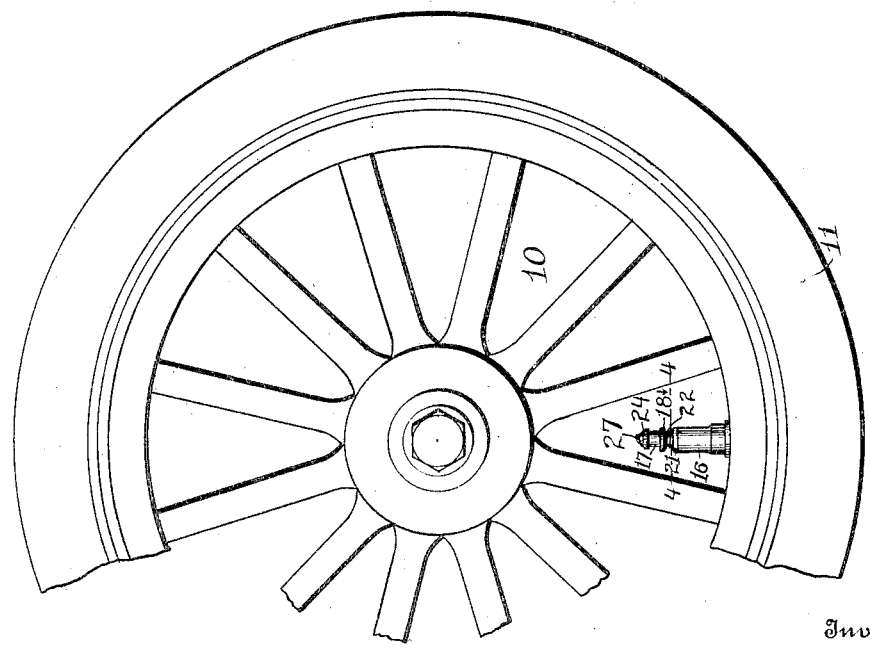
Witnesses
R. J. Jones.
J. H. Hister.
Inventor
M. Logan Chilson
By Victor J. Evans
Attorney

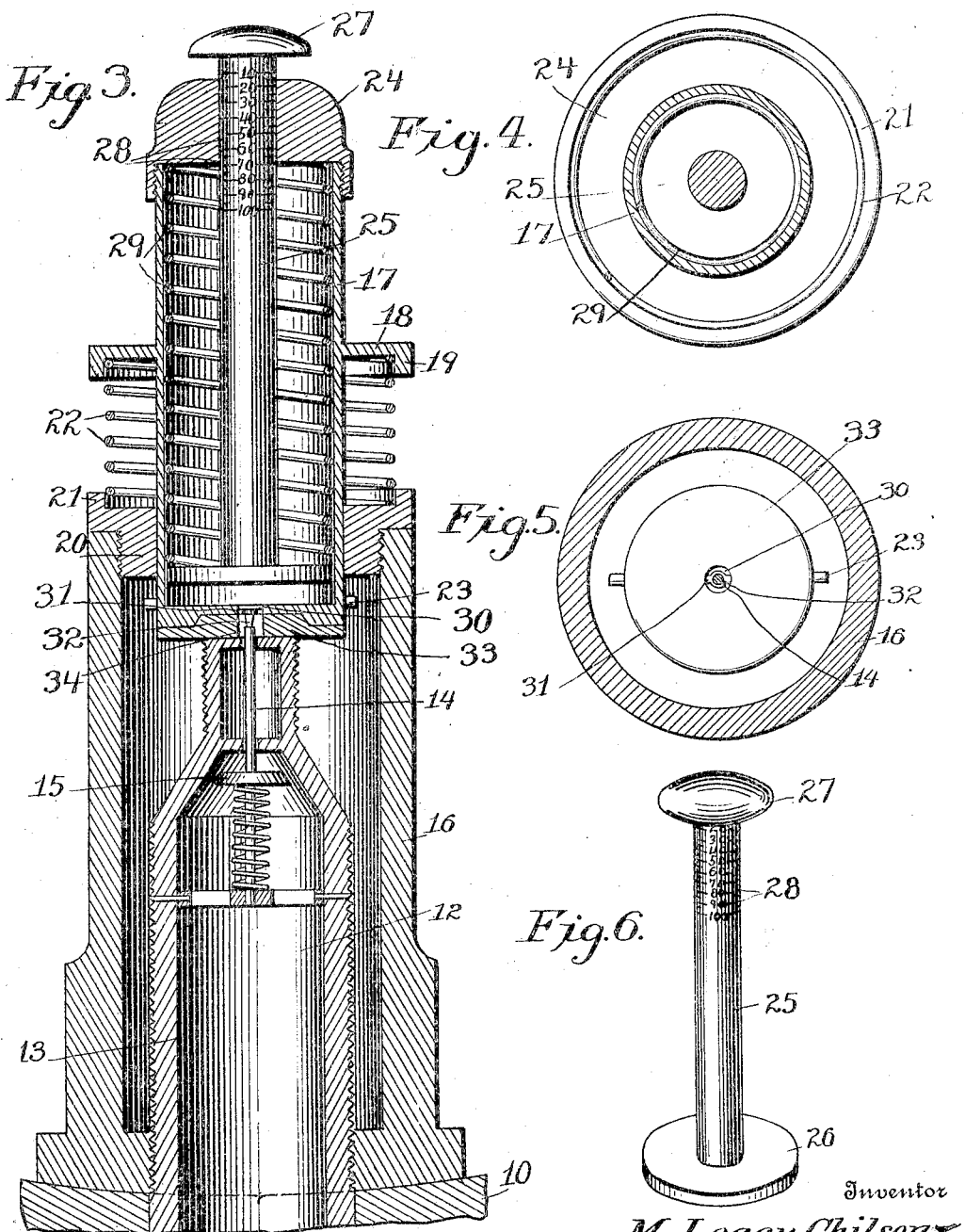

UNITED STATES PATENT OFFICE.

MARVIN LOGAN CHILSON, OF WEBSTER, SOUTH DAKOTA.

PRESSURE-GAGE.

1,089,326.

Specification of Letters Patent.

Patented Mar. 3, 1914.

Application filed November 25, 1911. Serial No. 662,461.

*To all whom it may concern:*

Be it known that I, MARVIN LOGAN CHILSON, a citizen of the United States, residing at Webster, in the county of Day and State of South Dakota, have invented new and useful Improvements in Pressure-Gages, of which the following is a specification.

An object of the invention is to provide a gage for determining the pressure of fluids.

My invention embodies a device more particularly adapted for use in connection with pneumatic tires on automobiles and the like, for determining the pressure of the air in the tire.

To accomplish the desired result, use is made of a casing for connection with the usual valve on pneumatic tires and pressure gaging means mounted on the said casing for determining the air pressure in the tire when the needle of the valve is pressed inwardly to permit the full force of the air to issue from the tire.

Reference is to be had to the accompanying drawings constituting a part of this specification, in which similar characters of reference denote corresponding parts in all the views, and in which—

Figure 1 is a fragmentary side elevation of a wheel equipped with a pneumatic tire and showing my device applied thereto. Fig. 2 is a vertical sectional view of my device showing the same in initial or non-registering position. Fig. 3 is an enlarged vertical transverse sectional view of the structure disclosed in Fig. 2, showing the gage in registering position. Fig. 4 is a transverse sectional view taken on the line 4—4 in Fig. 1. Fig. 5 is a transverse sectional view on the line 5—5 in Fig. 2. Fig. 6 is a perspective view of the piston and the head thereof.

Referring to the views, I employ a vehicle wheel 10 provided with a pneumatic tire 11 having the usual valve member 12 attached thereto for inflating the tire or exhausting the air therefrom, the said valve member consisting of a casing 13 having a spring-actuated needle 14 mounted to slide therein, a valve 15 being mounted on the needle 14 to normally close the opening of the casing and prevent the air in the tire 11 from passing outwardly through the casing 13.

The outer periphery of the casing 13 is preferably threaded and a tubular casing 16 is mounted in threaded engagement with the casing 13 as shown in Figs. 2 and 3, the valve member 12 being mounted within the casing 16 with the upper end of the needle 14 normally projecting a distance beyond the upper end of the casing 13.

A tubular casing 17 is provided with an integral circular plate 18 having an integral depending flange 19 and mounted to slide on the casing 17 is a collar 20 provided with an integral upwardly extending flange 21, a helical expansible spring 22 being mounted to encircle the casing 17 with the upper end of the spring abutting against the plate 18 and the lower end of the spring abutting against the collar 20, the flanges 19 and 21 being provided to act as guards for the spring 22 to properly retain the ends of the spring in engagement with the plate 18 and collar 20. A portion of the periphery of the collar 20 is threaded for engagement with the upper end of the casing 16 and suitable stop pins 23 are secured to the casing 17 to limit the upward sliding movement of the casing 17 in the collar 20. The periphery of the casing 17, at the upper end thereof, is threaded to receive a tubular cap 24 and mounted to slide in the casing 17 is a piston 25, provided at the lower end thereof with a piston head 26, the mentioned piston being adapted to project upwardly through the tubular portion of the cap 24, a knob 27 being provided on the upper end of the piston 25, exteriorly of the cap 24. The casing 17 is made substantially air-tight by having the piston 25 of a sufficient diameter to snugly pass through the opening in the cap 24 so that only a small amount of air, if any, can escape from the casing 17. The piston 25 is provided with a series of graduations 28 and mounted within the casing 17, to encircle the piston 25 is an expansible helical spring 29, the said spring being mounted so that the upper end thereof will abut against the under side of the cap 24 and the lower end thereof will abut against the upper side of the piston head 26 to normally retain the piston 25 and piston head 26 in lowermost position within the casing 17. An opening 30 is provided in the bottom of the casing 17 and formed on the bottom of the casing and extending across the opening 30 are arms 31 terminating at their outer ends in a needle seat 32, a suitable washer 33 being secured to the under side of the bottom of the casing 17 and provided with an opening 34, adapted to register with the opening 30 the said washer being adapted to provide an air-tight joint between the casing 17 and the upper end of the valve casing when the valve is in open position.

Now assuming that my device is attached to the casing 13 of the valve member 12, as shown in Fig. 1 and that the various parts of my device are in initial position as shown in Fig. 2, when it is desired to determine the air pressure in the tire 11, a downward pressure is exerted on the plate 18 by the operator, thus moving the entire casing 17 downwardly so that the needle seat 32 will engage the upper end of the needle 14 to move the same downwardly, thus unseating the valve 15 from the casing 13 so that the air contained in the tire 11 will pass outwardly through the opening in the casing 13. Now as the air passes outwardly from the casing 13, it will pass upwardly through the opening 30 and strike the under side of the piston head 26, thus moving the piston 25 and piston head 26 upwardly, in the casing 17, against the action of the spring 29 so that the pressure of the air can be determined by reading the particular graduation 28 or fractional graduation thereof that registers with the upper surface of the cap 24. By releasing the downward pressure on the plate 18, the spring 22 will move the casing 17 back to its normal position, thus causing the needle to move upwardly and the valve 15 will then close the opening in the casing 13.

Although I have described my device as employed in connection with a pneumatic tire, it will be readily seen that the gage can be conveniently employed for determining the pressures of various fluids and it will be understood that I do not limit myself to the particular manner of connecting the casing 17 to the casing 16 or the casing 16 to the casing 13, the scope of the invention being defined in the appended claims.

I claim:—

1. In a pressure gage, the combination with a casing for connection with a valve member, of a second casing having slidable connection with the first casing and movable longitudinally therein, means for normally holding the second casing in extended position in the first casing, and a pressure registering device mounted to slide in the second casing, the said second casing being movable in the first mentioned casing to engage and release the valve of the said valve member.

2. In a pressure gage, the combination with a casing for connection with a valve member, of a second casing having slidable connection with the first casing and movable longitudinally therein, a spring for normally holding the second casing in extended position in the first casing, and a spring-engaged graduated pressure registering device slidably mounted in the second casing, the said second casing being movable in the first mentioned casing and against the action of the first mentioned spring to engage and release the valve of the valve member.

3. In a pressure gage, the combination with a casing for connection with a valve member, of a second casing having slidable connection with the first casing and movable longitudinally therein, a spring for normally holding the second casing in extended position in the first casing, a cap for the second casing, a pressure registering piston mounted in the second casing and slidably extending through the said cap, and a spring engaging the said cap and the said piston to normally retain the piston in lowermost position within the second casing, the said second casing being movable in the first casing to engage and release the valve of the said valve member.

4. The combination of two members telescoped to form a pressure receiving chamber, one member being adapted for screw connection with a tire valve casing, a spring normally holding the members in extended relation, the second member carrying means to engage and open the tire valve when said member is depressed against the action of the spring, and means also carried by said second member and responsive to the pressure of air admitted to the chamber for indicating the amount of such pressure.

In testimony whereof I affix my signature in presence of two witnesses.

MARVIN LOGAN CHILSON.

Witnesses:
 WARD PIERCE,
 ALBERT SMITH.

Copies of this patent may be obtained for five cents each, by addressing the "Commissioner of Patents, Washington, D. C."